United States Patent
Shetty et al.

(10) Patent No.: US 9,141,771 B1
(45) Date of Patent: Sep. 22, 2015

(54) METHODS AND SYSTEMS FOR EMBEDDED LICENSING FROM MULTIPLE LICENSE SOURCES

(71) Applicant: FLEXERA SOFTWARE LLC, Itasca, IL (US)

(72) Inventors: Shweta Shetty, Sunnyvale, CA (US); Vikram Koka, Fremont, CA (US); Ann Shvarts, San Jose, CA (US)

(73) Assignee: FLEXERA SOFTWARE LLC, Schaumburg, IL (US)

( * ) Notice: Subject to any disclaimer, the term of this patent is extended or adjusted under 35 U.S.C. 154(b) by 0 days.

(21) Appl. No.: 14/667,635

(22) Filed: Mar. 24, 2015

(51) Int. Cl.
 *G06F 21/10* (2013.01)
(52) U.S. Cl.
 CPC ...... *G06F 21/105* (2013.01); *G06F 2221/0768* (2013.01)
(58) Field of Classification Search
 CPC .................. G06F 21/105; G06F 2221/0768
 USPC .......................................................... 726/29
 See application file for complete search history.

(56) References Cited

U.S. PATENT DOCUMENTS

| 8,103,804 B2* | 1/2012 | Koka et al. ............... 710/7 |
| 8,620,817 B2* | 12/2013 | Tabet ..................... 705/59 |
| 8,725,645 B1* | 5/2014 | Montini et al. .......... 705/52 |
| 2004/0088176 A1* | 5/2004 | Rajamani ................ 705/1 |
| 2011/0072522 A1* | 3/2011 | Koka et al. ............. 726/31 |
| 2012/0158415 A1* | 6/2012 | Koka et al. ............. 705/1.1 |

* cited by examiner

*Primary Examiner* — Saleh Najjar
*Assistant Examiner* — Oleg Korsak
(74) *Attorney, Agent, or Firm* — Michael A. Glenn; Perkins Coie LLP

(57) ABSTRACT

In embedded licensing from multiple license sources, a hardware device sends a capability request when a new licensed capability or modification to an existing licensed capability is desired. The hardware device transmits a first capability request to a first server and receives a first capability response from the first server. The hardware device then transmits a second capability request to a second server and receives a second capability response from the second server. When the first server and the second server are the same, regenerative licensing is activated by the hardware device, and an authorized capabilities list of the second capability response replaces an authorized capabilities list of the first capability response. When the first server and the second server are distinct, cumulative licensing is activated by the hardware device, and an authorized capabilities list of the second capability response is added to an authorized capabilities list of the first capability response.

19 Claims, 13 Drawing Sheets

METHODS AND SYSTEMS FOR EMBEDDED LICENSING FROM MULTIPLE LICENSE SOURCES

RELATED FIELD

Various embodiments of the invention generally relate to computer systems, and more specifically to methods and systems for embedded regenerative and cumulative licensing that supports multiple license sources.

BACKGROUND

Device manufacturers commonly sell products into different markets or at different price points, though the products' hardware devices may have similar bills of material and/or manufacturing costs. One way in which the device manufacturer can differentiate hardware devices is by the capabilities each device offers. For example, a hardware device having fewer capabilities may sell for a lower price than the same hardware device with additional or more sophisticated capabilities. These capabilities can be enabled by one or more licenses that are stored locally on the hardware device. Traditionally, licensed rights have been defined on a host and licensed software has been tied to a particular hardware device identity, thereby limiting a user's ability to upgrade capabilities or substitute one hardware device for another.

As described by U.S. Pat. No. 8,103,804, a device manufacturer may elect to implement an embedded regenerative licensing system if license requests are to be served by a single license server. That is, a regenerative licensing system can accurately update and maintain one or more licenses only if a hardware device transmits license requests to, and receives responses from, a single licensing source, e.g. server. Problems arise when two or more licensing sources, e.g. multiple licensing servers, are necessary to respond to license requests transmitted by a hardware device.

SUMMARY

Embodiments of the invention provide methods and systems for embedded licensing from multiple license sources. In an embodiment, a hardware device is configured to send a capability request if a new licensed capability or modification to an existing licensed capability is desired. In various embodiments, the hardware device transmits a first capability request to a first server and receives a first capability response from the first server. The hardware device then transmits a second capability request to a second server and receives a second capability response from the second server. The capability responses include one or more licenses for one or more authorized capabilities.

In various embodiments, the hardware device determines whether the first server and the second server are the same server. If the first server and the second server are the same, regenerative licensing is activated and the authorized capabilities list of the second capability response replaces the authorized capabilities list of the first capability response. If, however, the first server and the second server are distinct, cumulative licensing is activated and the authorized capabilities list of the second capability response is added to the authorized capabilities list of the first capability response.

DETAILED DESCRIPTION

Figure 1:
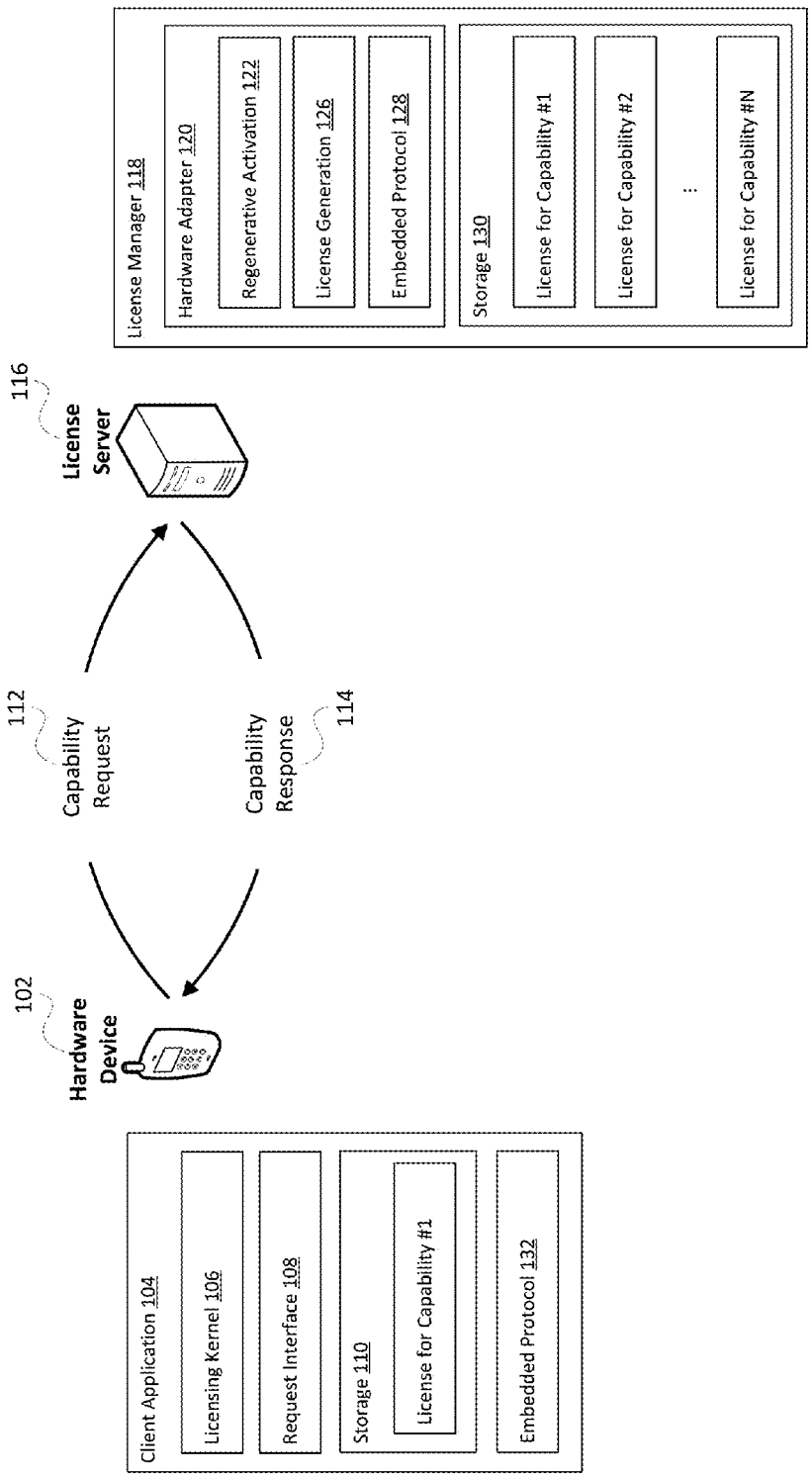
FIG. 1 is a system-level diagram of an embedded licensing system employing pure regenerative licensing according to various embodiments.

FIG. 1 is a system-level diagram of an embedded licensing system employing pure regenerative licensing. More specifically, FIG. 1 represents a single exchange, i.e. transmission/reception of a capability request 112 and transmission/reception of a capability response 114, between a hardware device 102 and a license server 116. In various embodiments, a hardware manufacturer, a third-party licensor, etc., authorizes one or more licensed functionalities to be used by the hardware device 102 via one or more licenses. The hardware device 102, which may also be described as an embedded system, can include various elements for licensing, including a client application 104, a licensing kernel 106, a request interface 108, a storage 110, an embedded protocol module 132, or some combination thereof. The hardware device 102 can be, for example, a radio, a personal digital assistant (PDA), a personal computer, a laptop, a tablet, a cellular phone, a networking device, etc. In various embodiments, the hardware device 102 is dedicated to one or more particular functions. For example, a radio for use by police officers, fire fighters, emergency responders, etc.

In an embodiment, the client application 104 manages one or more various components, e.g. licensing kernel 106, request interface 108, that allow a user to manage existing licenses, request additional licenses, etc. A request interface 108 can permit the user to request one or more licenses for a new desired capability or request a modification to an existing capability. For example, if a hardware device includes five licenses for a first capability, the user may use the request interface 108 to request five additional licenses for the first capability, i.e. ten total licenses of the first capability. Similarly, the user may use the request interface 108 to request five licenses for a second capability, i.e. five licenses for each of the first capability and the second capability.

A user requests a new desired capability, i.e. licensed functionality, by communicating with the license server 116 through the request interface 108, a web-based portal, etc. The desired capability can represent one or more initial capabilities of a hardware device 102, an upgrade in functionality for an already-deployed hardware device 102, or a modification to the authorized capabilities of an already-deployed hardware device 102. In various embodiments, a storage 110 is configured to store one or more licenses corresponding to one or more capabilities. Depending on the constraints of the hardware device 102, e.g. limited storage space, necessary security level, one form of storage may be preferred to the other. For example, the storage 110 may store buffer licenses if the hardware device 102 has limited storage capacity.

When a user desires an additional capability, a licensing kernel 106 can generate a capability request 112. In various embodiments, the user can indicate a desire for an additional capability by submitting a request via the request interface 108 or a web-based portal. The capability request 112 is a request for instructions from a license server 116 regarding what capabilities, if any, should exist on the hardware device 102. In various embodiments, the capability request 112 is received by a hardware adapter 120 of the license server 116. The hardware adapter 120 responds with a capability response 114, which indicates what capabilities, i.e. licensed functionalities, the hardware device 102 is authorized to use.

The hardware adapter 120 can also include a license generation module 126 that generates licenses in a format, e.g. binary, accepted by the hardware device 102. In some embodiments, the format is different from a conventional license file, e.g. plain text, and/or a conventional activation format, e.g. xml. One skilled in the art will recognize that any format could be used that is readable by both the license server 116 and the hardware device 102, e.g. proprietary binary format. In various embodiments, the hardware adapter 120 includes a regenerative activation module 122 that permits the license server 116 to employ a regenerative licensing scheme. More specifically, licenses received from the license server 116 are regenerative in nature, while the hardware device 102, e.g. client application 104, determines whether to replace or accumulate licenses. The regenerative activation module 122 can also perform various tasks related to license management. For example, if a hardware device 102 requests a new license from the license server 116, the regenerative activation module 122 may verify that the license server 116 released a license before granting the license, i.e. authorizing the capability, to the hardware device 102. In some embodiments, the hardware adapter 120 includes an embedded protocol module 128 that permits the license server 116 to interface with the hardware device 102. Similarly, the client application 104 can include an embedded protocol module 132. The embedded protocol modules 128, 132 can encode and decode, respectively, capability requests 112 and capability responses 114 based on a protocol defined for the hardware device 102.

Figure 2A:
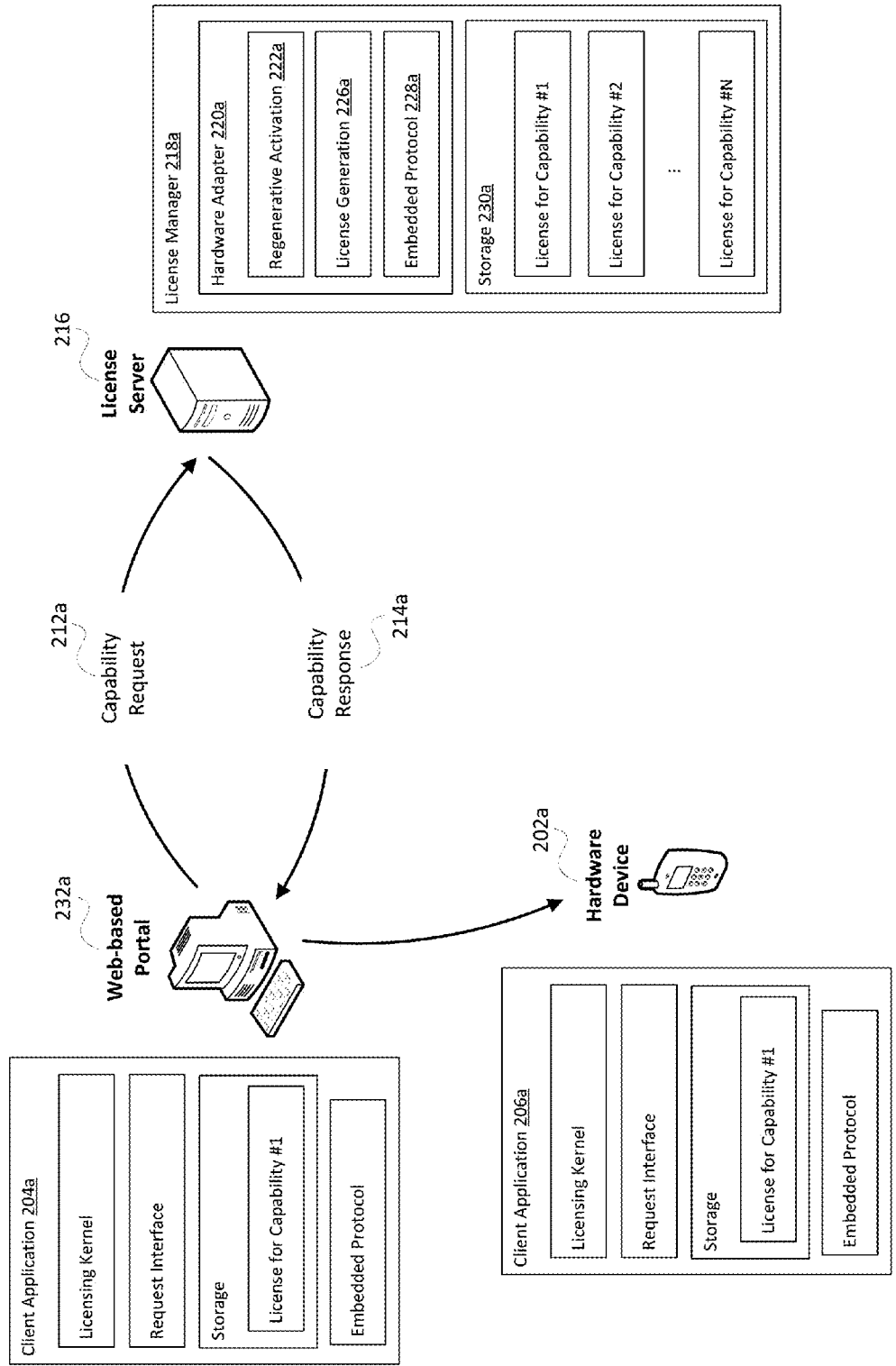
FIGS. 2A-B are system-level diagrams of embedded licensing systems according to various embodiments.
Figure 2B:
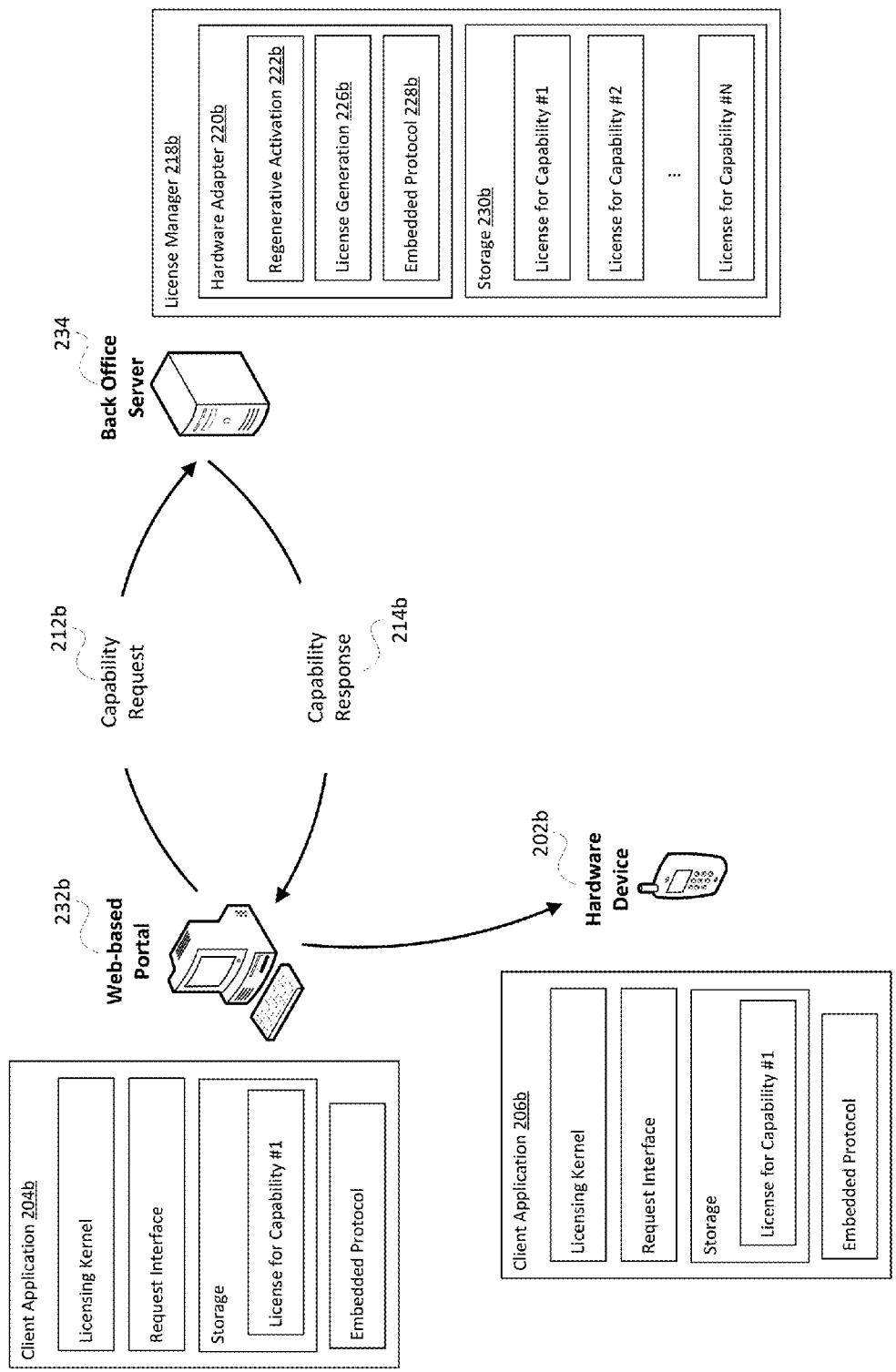

FIG. 2A is a system-level diagram of an embedded licensing system including a license server 216. FIG. 2B is a system-level diagram of an embedded licensing system including a back office server 234. In some embodiments, the user of a hardware device 202a-b accesses a web-based portal 232a-b through which the user requests one or more licenses for a new desired capability or a modification to an existing capability. The system hosting the web-based portal 232a-b can include a client application 204a that operates similar or identical to client application 104 of FIG. 1. The web-based portal 232a-b can be maintained by the manufacturer of the hardware device 202a-b, the owner of the license server 216, the licensor of the one or more licenses, a third-party, etc. In some embodiments, the web-based portal 232a-b allows the user to specify how many licenses are needed for a particular capability, how long the licenses are needed, e.g. a month, a year, indefinitely, whether a buffer license or a trusted storage license is preferred, etc.

In various embodiments, the web-based portal 232a-b transmits a capability request 212a-b to a hardware adapter 220a-b of a license server 216 on behalf of a hardware device 202a-b in response to the user submitting a request for a new desired capability or a modification to an existing capability. The hardware adapter 220a-b transmits a capability response 214a-b to the web-based portal 232a-b, which can then transmit the capability response 214a-b to a particular hardware device 202a-b, which also includes a client application 206a-b. For example, before submitting a request through the web-based portal 232a-b, the user may be prompted to enter a unique identifier associated with the hardware device 202a-b, a user login and password, etc.

As shown in FIG. 2B, a back office server 234 may replace the license server 216 as the license source. The back office server 234 may be identical or similar to the license server 216. Yet in some embodiments a distinction may be drawn between the license server 216, which operates on the client side, and the back office server 234, which is licensor-based.

Figure 3:
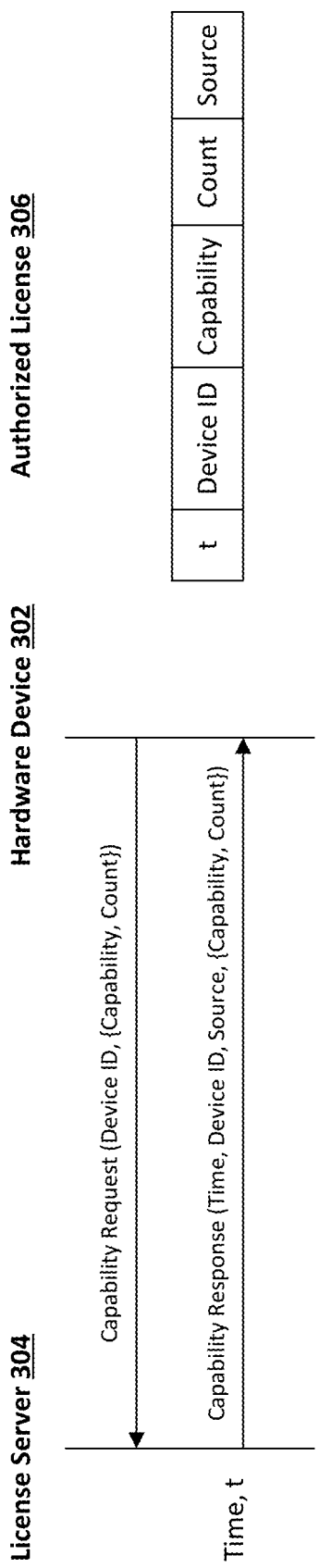
FIG. 3 is an example of a method for updating embedded licenses according to various embodiments.

FIG. 3 is an example of a method for updating embedded licenses according to various embodiments. In an embodiment, the method includes transmitting a capability request for a hardware device 302 to a license server 304. The capability request can include a unique identifier for the hardware device 302 and a desired functions list, which includes an identification of the capability requested and a count that represents the number of licenses desired. For example, the capability request may always include the unique identifier for the hardware device but only include the desired functions list in particular instances. The hardware device 302 can receive a capability response transmitted by the license server 304. The capability response may include a timestamp, the unique identifier for the hardware device, an identification of the licensing source, and an authorized functions list to enable on the hardware device, which includes an identification of the capability granted and a count that represents the number of licenses transmitted and authorized.

Figure 4:
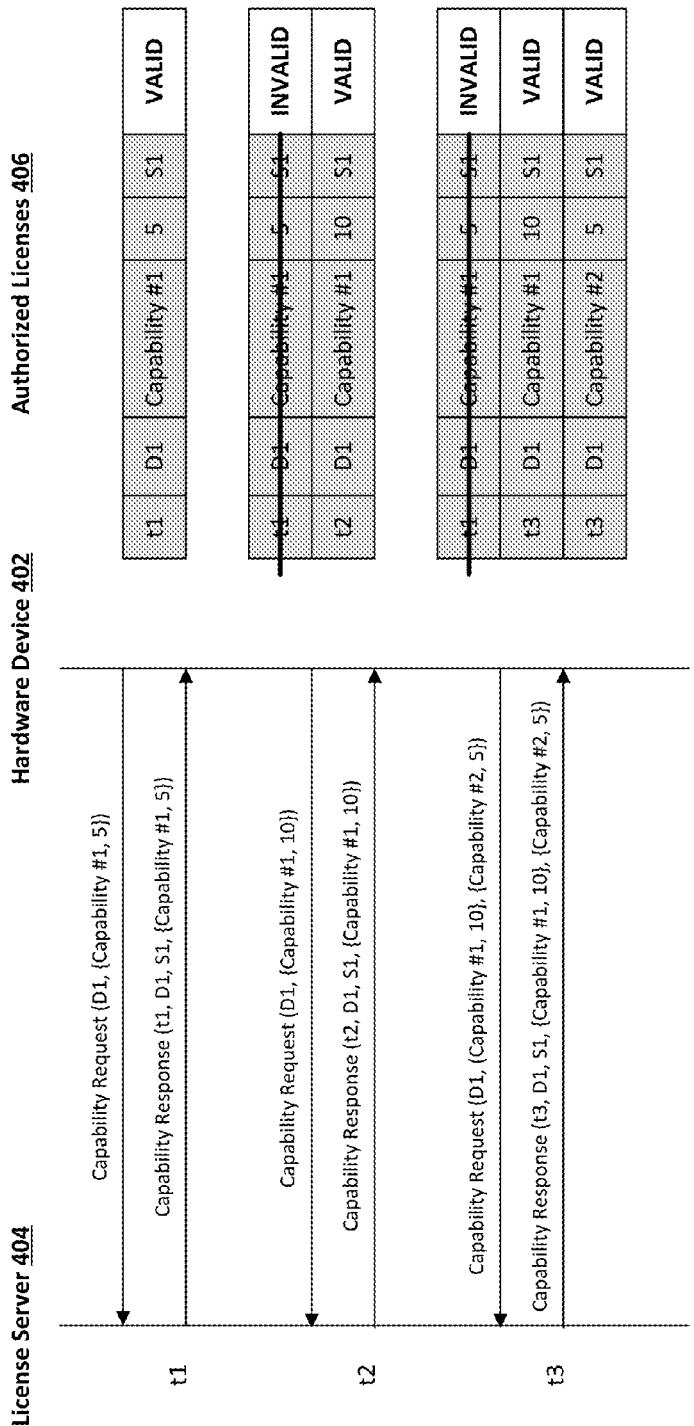
FIG. 4 is an example of a method for updating embedded licenses using regenerative licensing according to various embodiments.

FIG. 4 is an example of a method for updating embedded licenses using regenerative licensing. First, the hardware device 402 transmits a capability request for five licenses of capability #1. At time t1, the license server 404 grants the request and transmits a capability response that includes authorized licenses 406. Accordingly, the hardware device 402 includes five authorized licenses for capability #1 at time t1.

Second, the hardware device 402 transmits a capability request for ten total licenses for capability #1, i.e. five additional licenses. At time t2, the license server 404 transmits a capability response that grants the request and authorizes ten total licenses. Third, the user of the hardware device 402 determines that she requires five licenses of capability #2 and transmits a capability request for five licenses of capability #2 and ten licenses of capability #1. At time t3, the license server 404 transmits a capability response that includes all capabilities that have been authorized on the hardware device 402 by license server 404. The capability response transmitted at time t4 includes ten authorized licenses for capability #1 and five authorized licenses for capability #2.

Figure 5:
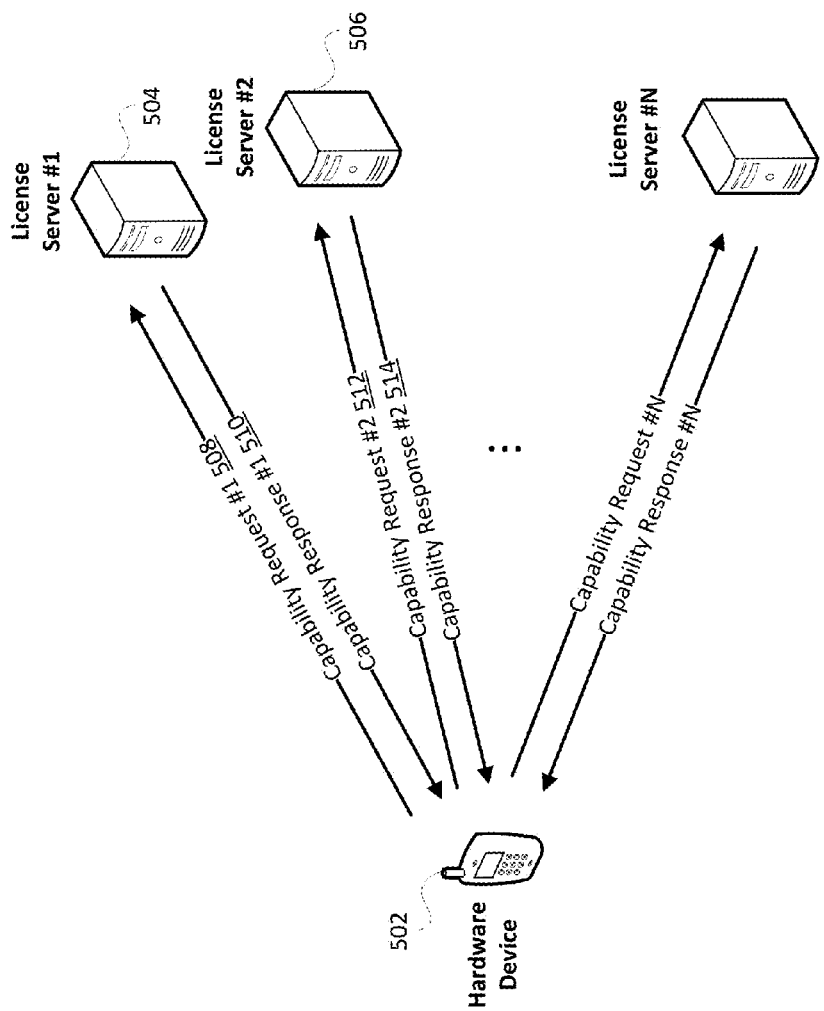
FIG. 5 is a system-level diagram of an embedded licensing system that includes multiple licensing sources according to various embodiments.

FIG. 5 is a system-level diagram of a hardware device 502 employing an embedded licensing system for accumulating licenses acquired from multiple licensing sources. A licensing source can be a licensing server, a proxy server, a back office server, etc. Regenerative licensing, which requires that a new capability response overwrite any previous capability responses, causes significant problems when a hardware device 502 transmits capability requests 508, 512, to two or more licensing sources, e.g. license servers 504, 506. For example, a hardware device 502 may transmit a first capability request 506 to a first license server 504, which transmits a first capability response 508 that authorizes one or more capabilities. The hardware device 502 may subsequently transmit a second capability request 512 to a second license server 506, which transmits a second capability response 514 that authorizes one or more capabilities. If a pure regenerative licensing scheme is implemented by the hardware device 502, a subsequent capability response overwrites all previous capability responses. That is, the second capability response 514 overwrites the first capability response 510 and any authorizations granted by the first capability response 510 are lost. One having ordinary skill in the art will recognize that any number of licensing sources may be used to maintain a subset of licenses or licenses for a particular capability.

Figure 6:
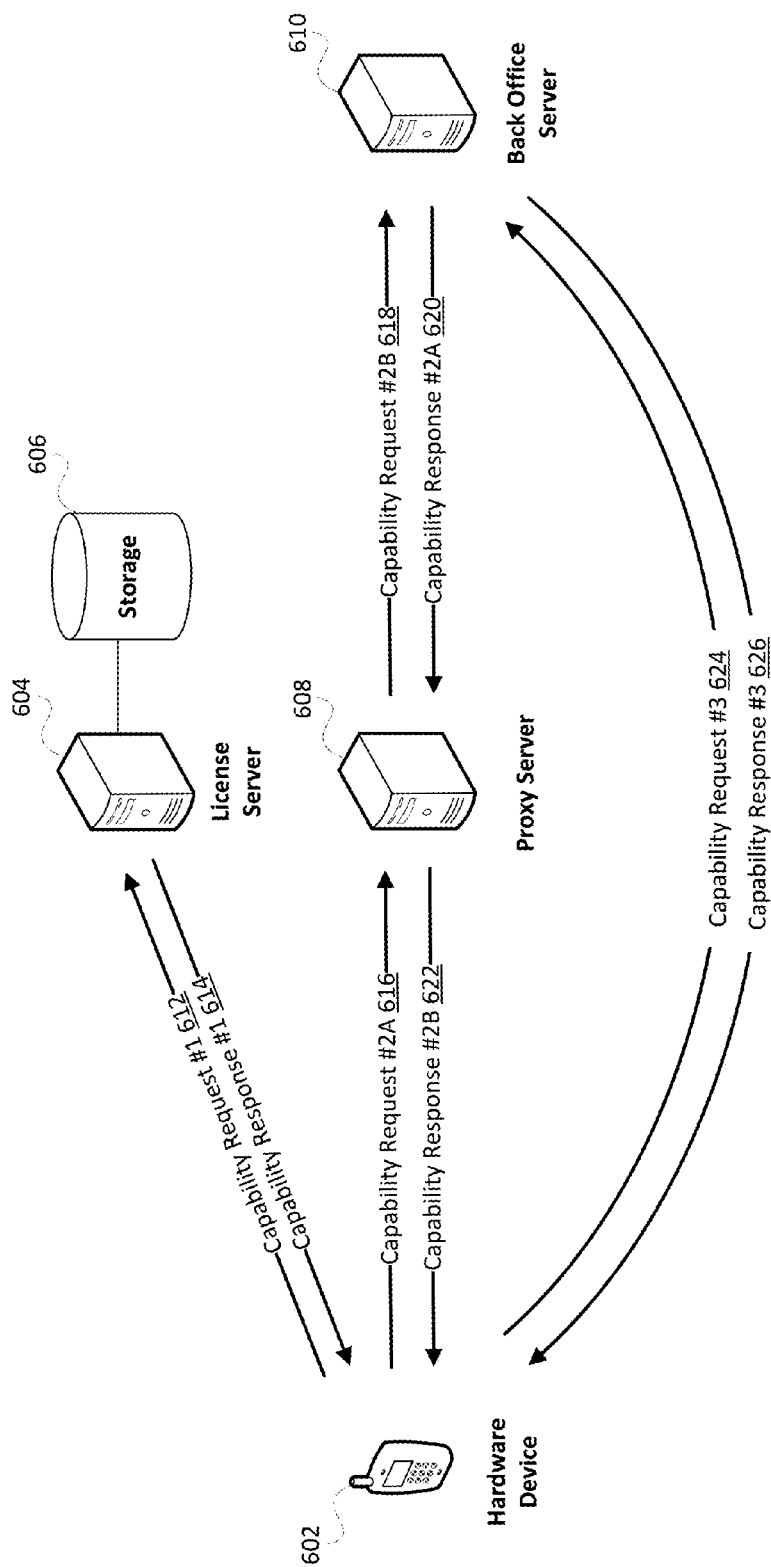
FIG. 6 is a system-level diagram of another embedded licensing system according to various embodiments.

FIG. 6 is another system-level diagram of an embedded licensing system according to various embodiments. The embedded licensing systems described herein can support various licensing architectures. In an embodiment, a hardware device 602 transmits a first capability request 612 to a license server 604 that includes a storage 606. The license server 604 transmits a first capability response 614 that includes an authorization to use one or more of the licenses stored on the server 604, e.g. in storage 606.

In some embodiments, the hardware device 602 transmits a second capability request 616 to a proxy server 608. The proxy server 608 relays the capability request 616 transmitted by the hardware device 602 to a back office server 610, e.g. relayed by capability response 618. The back office server 610 generates a capability response 620 that authorizes the hardware device 602 to use one or more of the licenses stored on the back office server 610. For example, the back office server 610 may transmit an authorization via a capability response 620 that is received by proxy server 608 and relayed to the hardware device 602 by capability response 622. Similarly, the hardware device 602 may transmit a third capability request 624 to, and receive a third capability response 626 from, the back office server 610. Various subsets of these configurations may be employed by a hardware device 602 in certain instances. For example, a hardware device 602 may be able to communicate with a back office server 610 via a proxy server 608, but may be unable to directly communicate with the back office server 610.

In some embodiments, the hardware device 602 communicates, e.g. via a license manager, with an operations database to store and retrieve licensing information. A hardware adapter, e.g. hardware adapter 100 of FIG. 1, can communicate with an embedded fulfillments database for storage and retrieval of what capabilities have been authorized on a particular hardware device. The operations database and the embedded fulfillments database may be combined into a single database located on a single server, e.g. back office server 610. In some embodiments, a license server 604 includes a storage 606 that stores and retrieves licensing information, also referred to as capability fulfillment data, and/or stores and retrieves a record of what capabilities have been authorized on a particular hardware device.

Figure 7:
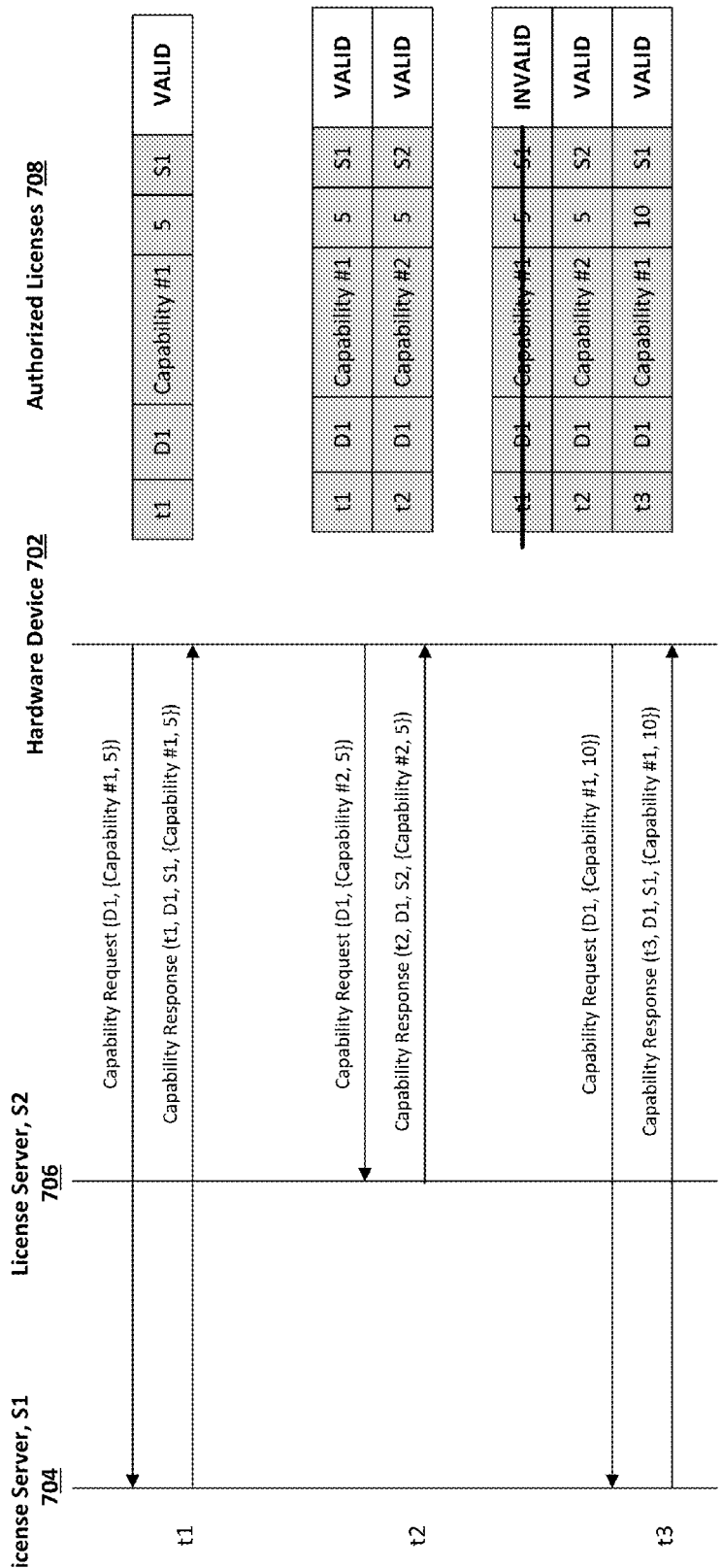
FIG. 7 is an example of a method for updating embedded licenses using regenerative licensing and cumulative licensing schemes.

FIG. 7 is an example of a method for updating embedded licenses using regenerative licensing and cumulative licensing schemes. The methods and systems described herein employ an embedded licensing architecture that uses regenerative licensing and cumulative licensing to overcome the problems associated with acquiring licenses from multiple licensing sources. Capability responses obtained from the same license server are regenerative in nature, i.e. employ regenerative licensing, while capability responses obtained from distinct license servers are cumulative in nature, i.e. employ cumulative licensing. The hybrid licensing architecture described herein ensures that capability responses and licenses from multiple license sources can coexist on a single hardware device.

In an embodiment, a hardware device 702 transmits a first capability request to a first license server 704. After receiving the first capability request, the first license server 704 transmits a first capability response that authorizes one or more licenses for one or more capabilities, e.g. five counts for Capability #1.

However, a user of the hardware device 702 may later determine that one or more additional capabilities or counts are desired. If the hardware device 702 transmits a second capability request to a distinct license server, e.g. second license server 706, cumulative licensing is activated. When cumulative licensing is enabled, any licenses received by the hardware device 702 from the second license server 706 are added to any licenses 708 that were previously stored on hardware device 702. By successively adding on new licenses from distinct license sources, older licenses are unaffected, i.e. hardware device 702 retains licenses for all previous capabilities.

If the hardware device 702 transmits a capability request to the same license server, e.g. license server 704, regenerative licensing is activated. Details with respect to regenerative licensing are described above at least with respect to FIGS. 3 and 4.

Figure 8:
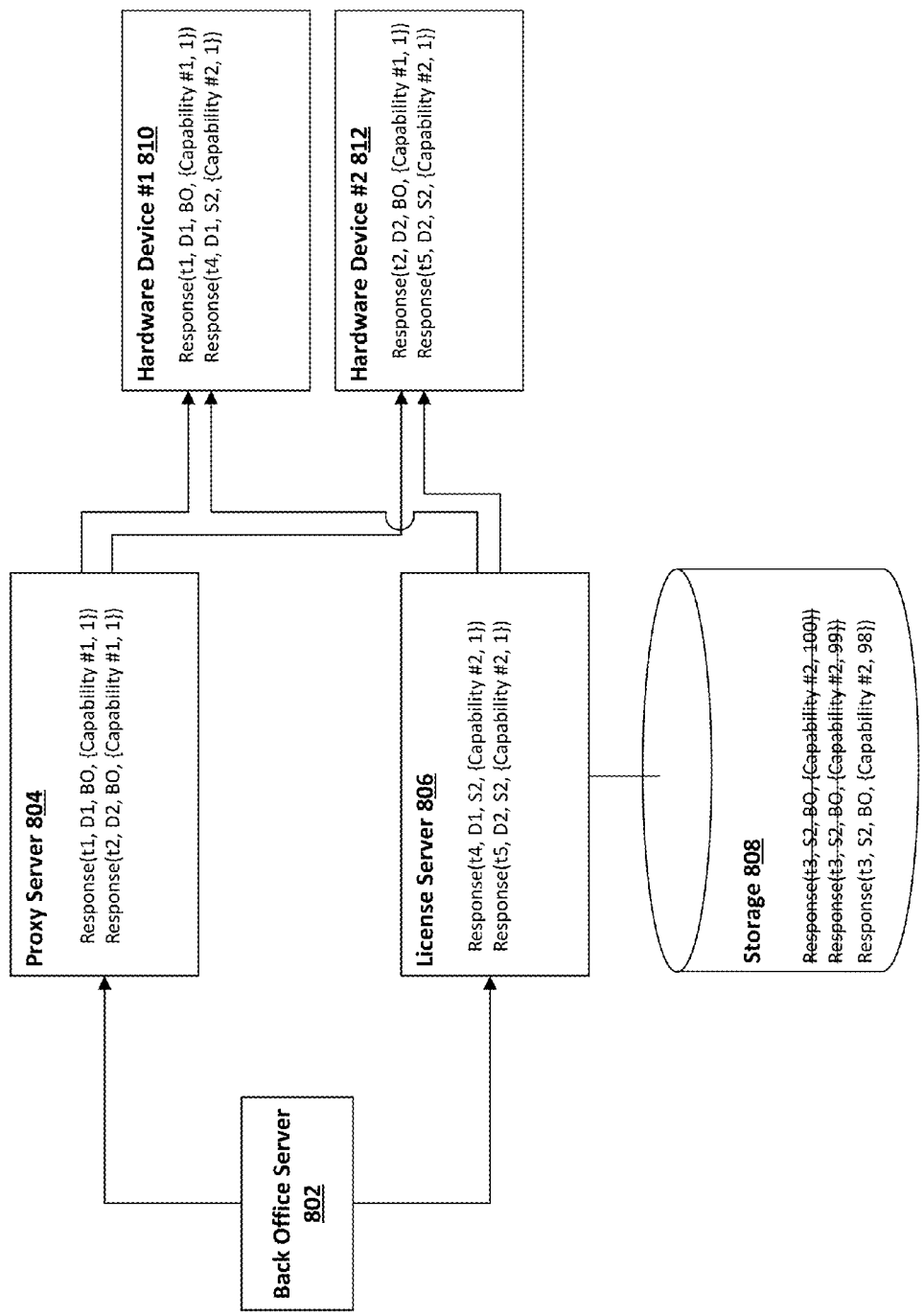
FIG. 8 is a block diagram illustrating the flow of licensed functionalities to a plurality of hardware devices according to various embodiments.

FIG. 8 is a block diagram illustrating the flow of licensed functionalities to a plurality of hardware devices 810, 812. In various embodiments, a back office server 802 stores licenses for one or more capabilities. Additional capabilities, i.e. licenses, can be authorized on the hardware devices 810, 812 directly from the back office server 802, through a proxy server 804, by an independent license server 806, or some combination thereof. Regardless of the source of the capability response, a capability request is generated and transmitted as described above. That is, a capability request is generated through a request interface or a web-based portal, and can include one or more desired features, a unique identifier for the hardware device, and a desired count of licenses.

In various embodiments, the proxy server 804 is configured such that licenses are not stored locally, i.e. all licenses are stored on a back office server 802. The proxy server 804 may request a license from the back office server 802 on behalf of the hardware devices 810, 812. For example, hardware device 810 and hardware device 812 each requested and received a single license for Capability #1 that originated from the back office server 802 ("BO").

In various embodiments, the license server 806 locally stores one or more licenses in a storage 808. In an embodiment, the license server 806 transmits a capability response that includes one or more licenses stored in the storage 808 upon receiving a capability request from a hardware device. Although a hardware device may include both trusted storage licenses and buffer licenses, the hardware device only implements a single type of license received from a single license source.

For example, license server 806 includes 100 counts of capability #2 in storage 808. Hardware device 810 and hardware device 812 each requested and received a single authorized license for capability #2 that originated from the license server 806 ("S2"). When the license server 806 transmits a capability response that includes one or more authorized licenses, those licenses are deducted from storage 808.

Figure 9:
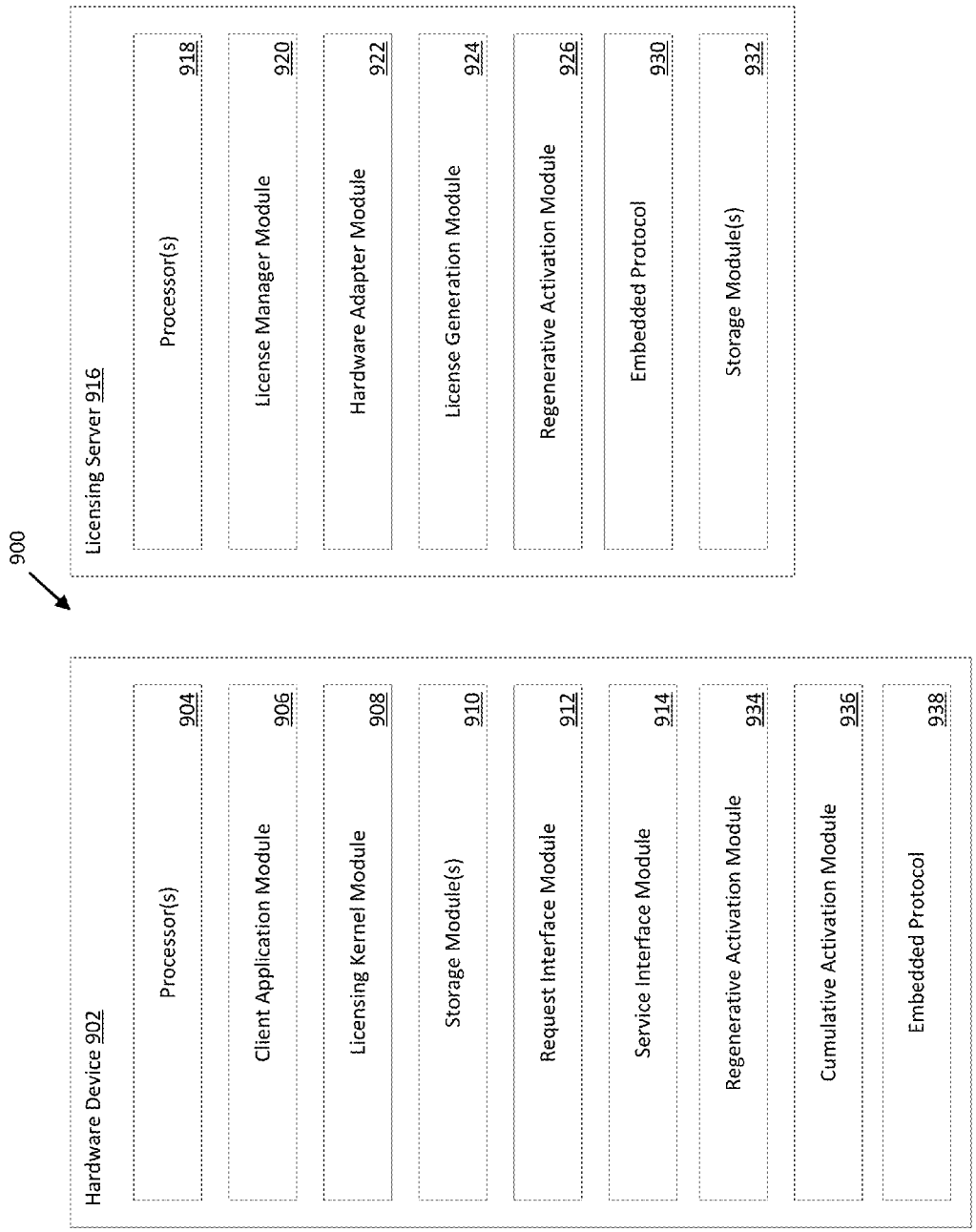
FIG. 9 is a block diagram with exemplary components of an embedded licensing system according to various embodiments.

FIG. 9 is a block diagram with exemplary components of an embedded licensing system 900. In an embodiment, the embedded licensing system 900 includes a hardware device 902 and at least one licensing source, e.g. licensing server 916. The hardware device 902 can include one or more processors 904, a client application module 906, a licensing kernel module 908, one or more storage modules 910, a request interface module 912, a service interface module 914, a regenerative activation module 934, a cumulative activation module 936, and an embedded protocol module 938. The licensing server 916 can include one or more processors 918, a license manager module 920, a hardware adapter module 922, a license generation module 924, a regenerative activation module 926, an embedded protocol module 930, and one or more storage modules 932. Other embodiments of embedded licensing system 900 may include some, all, or none of these modules and components, along with other modules, applications, and/or components. Some embodiments may incorporate two or more of these modules into a single module and/or associate a portion of the functionality of one or more of these modules with a different module.

Storage modules 910, 932 can be any device or mechanism used for storing information. In an embodiment, storage modules 910, 932 store instructions for running one or more of the applications or modules, e.g. client application module 906, regenerative activation module 934, on the one or more processors 904, 918. For example, storage module 910 may house all or some of the instructions needed to execute the functionality of the client application module 906, the licensing kernel module 908, etc. Similarly, storage module 932 may house all or some of the instructions needed to execute the functionality of the license manager module 920, the hardware adapter module 922, etc.

The client application module 906 and licensing kernel module 908 can manage communications between components of the hardware device 902 and/or other systems, e.g. licensing server 916. The licensing kernel module 908 and/or client application module 906 can also handle transmitting capability requests, receiving capability responses, processing and maintaining license authorizations, etc.

The request interface module 912 can allow a user to request a new desired capability or a modification to an existing capability. For example, if the hardware device 902 includes a license for a first capability, the user can use the request interface module 912 to request an additional license for the first capability or a license for a distinct second capability. In an embodiment, the service interface module 914 includes one or more interfaces for storage, time, hardware device identity, cryptography, etc. The one or more interfaces can be delivered by the hardware device manufacturer and, in some embodiments, be overwritten, modified, etc., by the user of the hardware device 902 based on particular hardware device configurations, desired capabilities, etc.

The regenerative activation module 934 processes licenses using regenerative logic, described above at least with respect to FIGS. 3, 4, and 7. For example, if the client application module 906 and/or licensing kernel module 908 determine that the hardware device 902 has previously received a capability response from the licensing server 916, regenerative activation module 934 ensures regenerative logic is applied. The cumulative activation module 936 processes licenses using cumulative logic, described above at least with respect to FIG. 7. For example, if the client application module 906 and/or licensing kernel module 908 determine that the hardware device 902 has not previously received a capability response from the licensing server 916, cumulative activation module 936 ensures cumulative logic is applied.

The license manager module 920 can communicate with storage module(s) 932, a back office server, etc., to store and retrieve licensing information. Various components of the hardware device 902, including the client application module 906 and licensing kernel module 908, can communicate with the license manager module 920 and/or hardware adapter module 922 regarding what authorizations should exist on the hardware device 902. When a capability request is submitted by the hardware device 902, the hardware adapter module 922 responds with a capability response that authorizes the hardware device 902 to use one or more licensed capabilities.

The license generation module 924 can generate and/or modify licenses to be in the binary format accepted by the hardware device 902. In some embodiments, the licensing server 916 and the hardware device 902 include embedded protocol modules 938, 930 for encoding and decoding, respectively, capability requests, capability responses, license formats, etc., defined for the hardware device 902.

Figure 10:
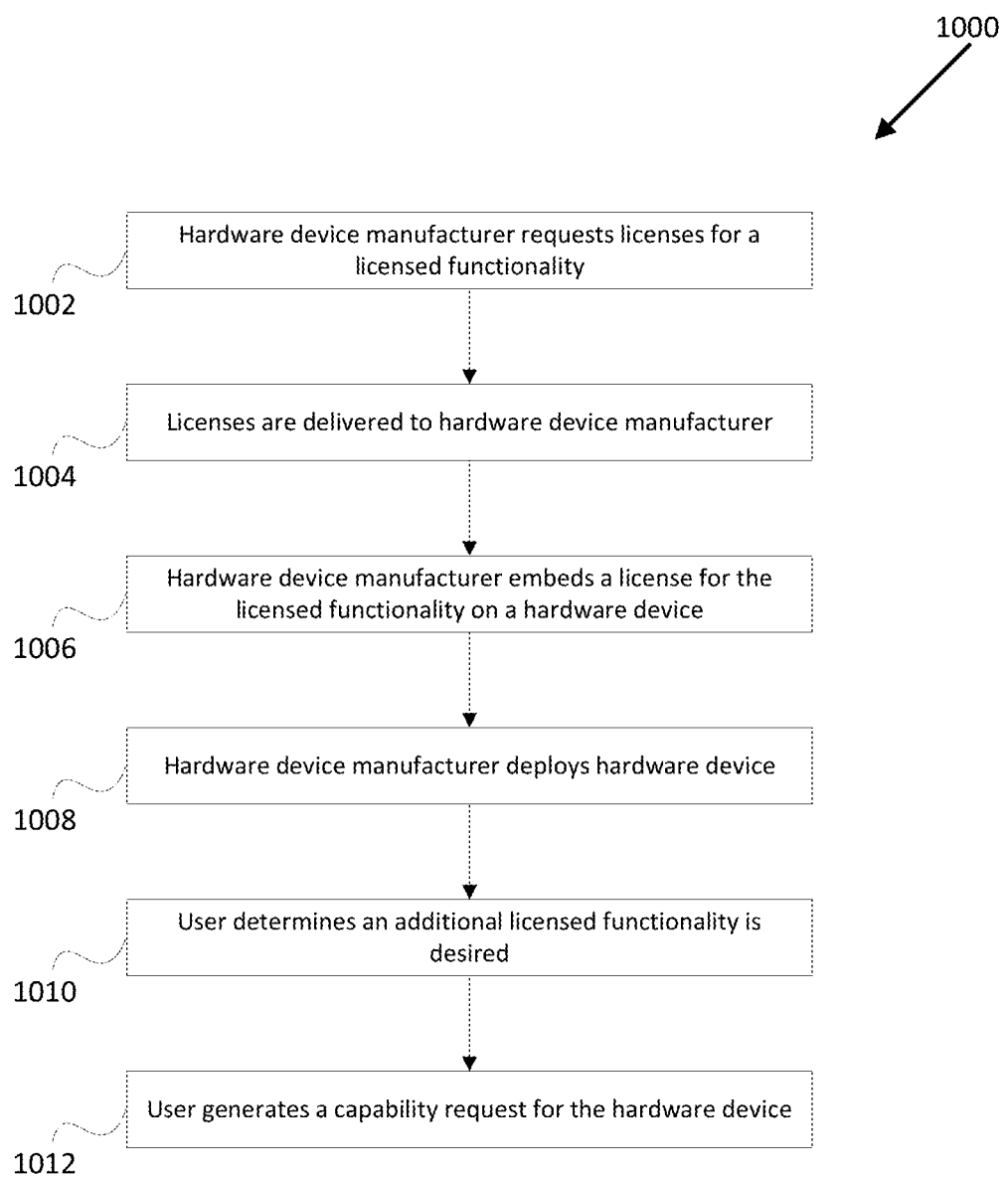
FIG. 10 is a flow diagram of a process for acquiring and deploying an embedded licensing hardware device according to various embodiments.

FIG. 10 is a flow diagram of a process 1000 for acquiring and deploying an embedded licensing product from a license provider to a device manufacturer. At block 1002, a device manufacturer requests one or more licenses for a licensed functionality from a license provider. At block 1004, the one or more licenses for the licensed functionality are delivered to the device manufacturer upon completion of the transaction. At block 1006, the device manufacturer embeds the one or more licenses on one or more hardware devices that are to be sold and delivered to a user. The hardware devices can be, for example, a radio, a PDA, a personal computer, a laptop, a tablet, a cellular phone, a networking device, etc. At block 1008, the device manufacturer deploys the hardware device, i.e. delivers the hardware device to a user. The deployed hardware device includes at least one license for a first licensed functionality. At block 1010, the user determines an additional licensed functionality is desired for the deployed hardware device. The additional licensed functionality can be an additional license for the first licensed functionality or a license for a distinct second licensed functionality. At block 1012, the user generates a capability request for the deployed hardware device using one of the systems and/or methods described herein. In some embodiments, the capability request is generated by an application or module, e.g. request interface module 912 of FIG. 9, on the deployed hardware device. In some embodiments, the capability request is generated by a web-based portal, e.g. web-based portal 232 of FIG. 2. One skilled in the art will recognize that the hardware devices could just as easily be sold without any initial licenses. That is, the user may need to generate a capability request before the hardware device has any functionality.

Figure 11:
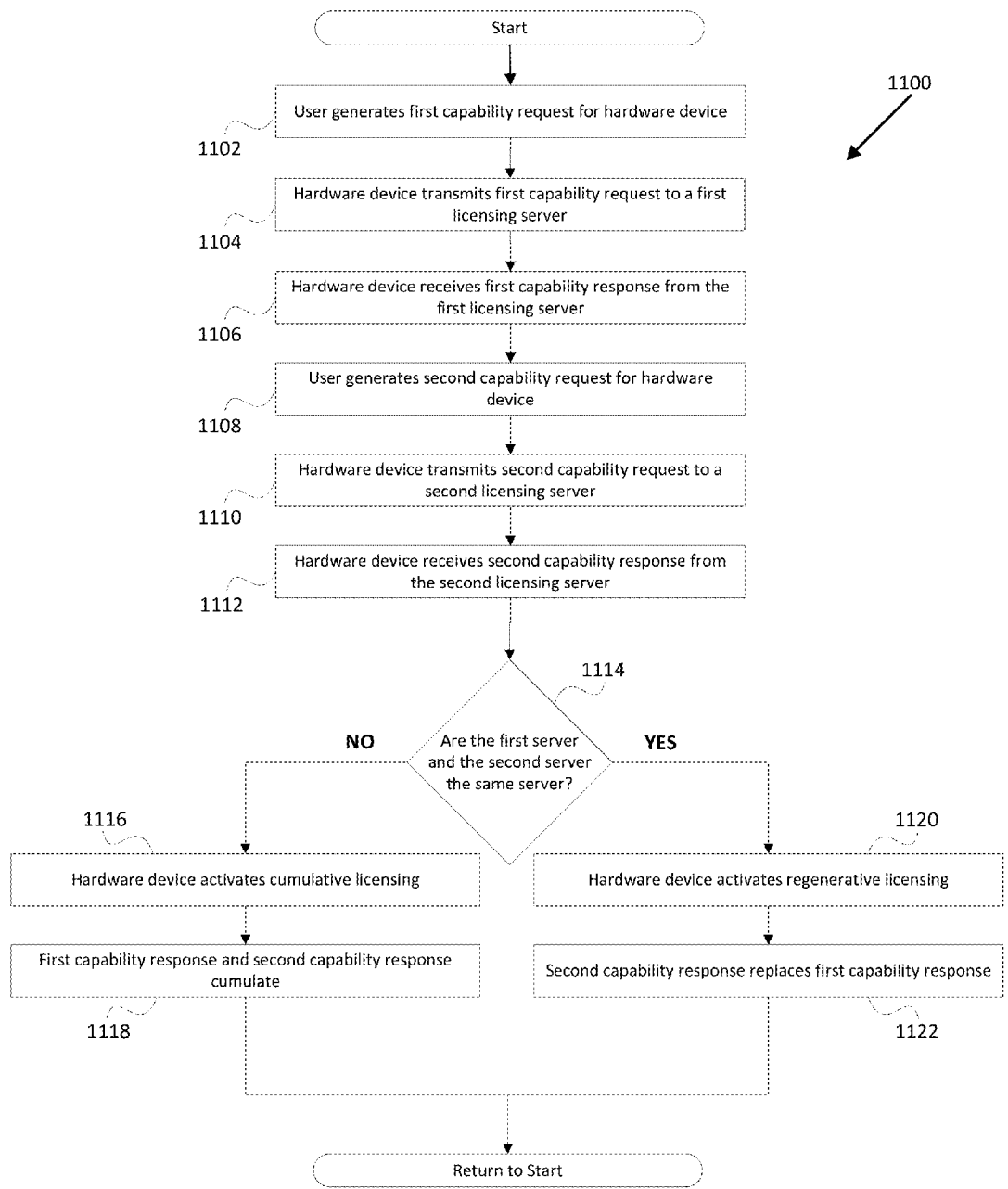
FIG. 11 is a flow diagram of an example process for adding new licenses and modifying existing licenses on a hardware device according to various embodiments.

FIG. 11 is a flow diagram of an example process 1100 for adding new licenses and modifying existing licenses on a hardware device. In various embodiments, the process 1100 is executed by a hardware device having various modules, e.g. hardware device 902 of FIG. 9, and/or various architectures, e.g. embedded licensing systems of FIGS. 5-6. At block 1102, a user generates a first capability request for a hardware device. The first capability request can be for one or more licenses for a first licensed functionality. At block 1104, the hardware device transmits the first capability request to a first licensing server. The first licensing server can be a licensing server, a proxy server, a back office server, etc., and can employ any of the licensing architectures described above with respect to FIGS. 5-6. In various embodiments, the first licensing server includes a hardware adapter, e.g. hardware adapter 120 of FIG. 1, to receive the first capability request. At block 1106, the hardware device receives a first capability response from the first licensing server. The first capability response includes one or more licenses for the first licensed functionality.

At block 1108, the user generates a second capability request for the hardware device. The second capability request can be for one or more additional licenses for the first licensed functionality or one or more licenses for a distinct second licensed functionality. At block 1110, the hardware device transmits the second capability request to a second licensing server. At block 1112, the hardware device receives a second capability response from the second licensing server.

At block 1114, the hardware device, e.g. regenerative activation module, cumulative activation module, determines whether the first server and the second server are the same server, i.e. distinct servers. The hardware device can determine whether to activate regenerative licensing or cumulative licensing based on whether the first licensing server and the second licensing server are the same server.

If the first licensing server and the second licensing server are distinct, cumulative licensing is activated. At block 1116, the hardware device activates cumulative licensing, e.g. cumulative activation module 936 of FIG. 9. At block 1118, cumulative licensing causes the first capability response and the second capability response to accumulate, i.e. add on to one another. Accordingly, the hardware device is permitted to use those capabilities authorized by the first capability response and those capabilities authorized by the second capability response.

If the first licensing server and the second licensing server are the same, regenerative licensing is activated. At block 1120, the hardware device activates regenerative licensing, e.g. regenerative activation module 934 of FIG. 9. At block 1122, regenerative licensing causes the second capability response to replace the first capability response. Accordingly, the hardware device is permitted to use only those licenses authorized by the second capability response. The process 1100 can begin again, i.e. return to "Start," once completed.

Figure 12:
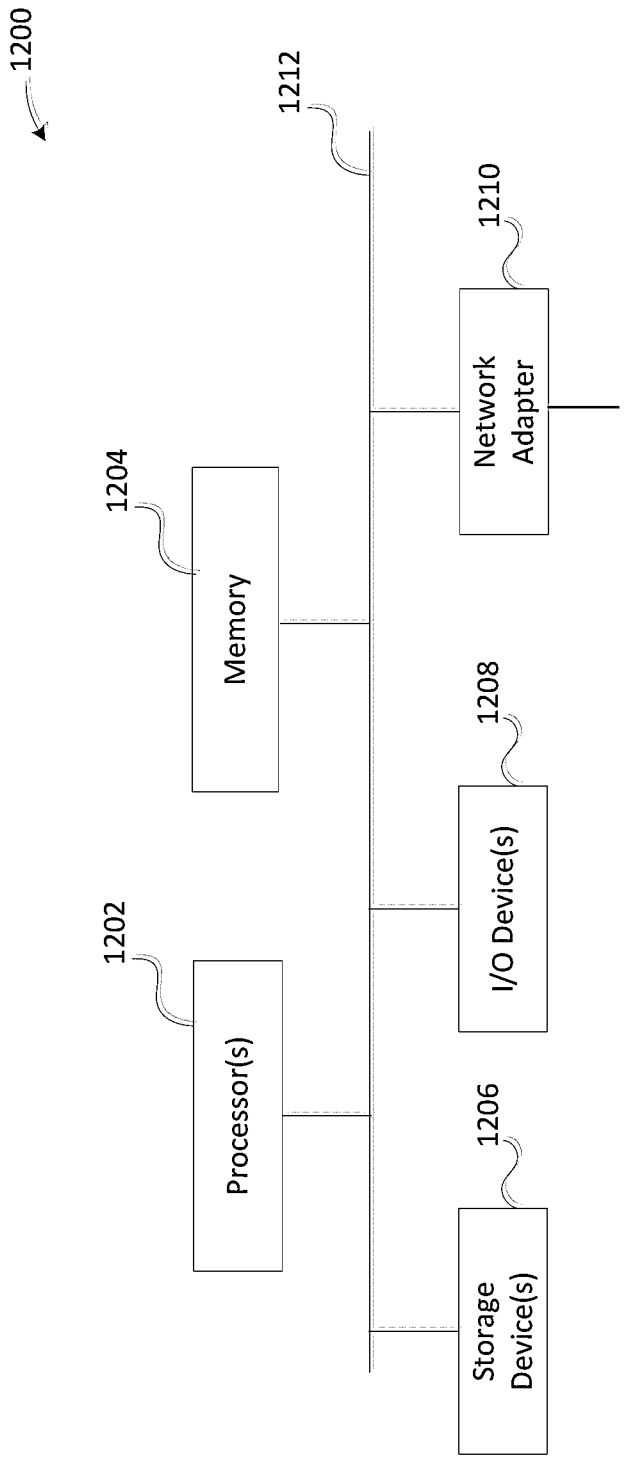
FIG. 12 is a block diagram illustrating an example of a computer system in which at least some operations described herein can be implemented, consistent with various embodiments.

FIG. 12 is a block diagram illustrating an example of a computer system 1200 in which at least some operations described herein can be implemented, consistent with various embodiments. The computing system 1200 may include one or more central processing units ("processors") 1202, a storage or memory 1204, input/output devices 1208, e.g. keyboard and pointing devices, display devices, storage devices 1206, e.g. disk drives, and network adapters 1210, e.g. network interfaces, that are connected to an interconnect 1212. The interconnect 1212 is illustrated as an abstraction that represents any one or more separate physical buses, point to point connections, or both connected by appropriate bridges, adapters, or controllers. The interconnect 1212, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 1204 and storage devices 1206 are computer-readable storage media that may store instructions that implement at least portions of the described technology. "Memory" or "storage," as those terms are used herein, refer to any recording media used to retain digital data. In addition, the data structures and message structures may be stored or transmitted via a data transmission medium, such as a signal on a communications link. Various communications links may be used, such as the Internet, a local area network, a wide area network, a point-to-point dial-up connection, etc. Thus, computer-readable media can include computer-readable storage media, e.g. "non-transitory" media, and computer-readable transmission media.

The instructions stored in memory 1204 can be implemented as software and/or firmware to program the processor(s) 1202 to carry out actions described above. In some embodiments, such software or firmware may be initially provided to the computer system 1200 by downloading it from a remote system through the computing system 1200, e.g. via network adapter 1210.

The techniques introduced herein can be implemented by, for example, programmable circuitry, e.g. one or more microprocessors, programmed with software and/or firmware, or entirely in special-purpose hardwired, i.e. non-programmable, circuitry, or in a combination of such forms. Special-purpose circuitry can be in the form of, for example, one or more application-specific integrated circuits (ASICs), programmable logic devices (PLDs), field-programmable gate arrays (FPGAs), etc.

Software or firmware to implement the techniques introduced herein may be stored on a machine-readable storage medium and may be executed by one or more general-purpose or special-purpose programmable microprocessors. A "machine-readable medium," as the term is used herein, includes any mechanism that can store information in a form accessible by a machine, e.g. computer, network device, cellular phone, PDA, manufacturing tool, any device with one or more processors. For example, a machine-accessible medium includes recordable/non-recordable media, e.g. read-only memory (ROM), random access memory (RAM), magnetic disk storage media, optical storage media, flash memory devices.

The language used in the Detailed Description has been principally selected for readability and instructional purposes, and it may not have been selected to delineate or circumscribe the inventive subject matter. It is therefore intended that the scope of the technology be limited not by the Detailed Description, but rather by any claims that issue on an application based hereon. Accordingly, the disclosure of the embodiments of the technology is intended to be illustrative, but not limiting, of the scope of the technology, which is set forth in the following claims.

The invention claimed is:

1. A computer-implemented method, comprising:
transmitting a first capability request for a hardware device to a first hardware adapter of a first server, for storage at the first server as capability fulfillment data that comprises a first licensed functionality enabled by capability responses;
transmitting a second capability request for the hardware device to a second hardware adapter of a second server, for storage at the second server as capability fulfillment data that comprises a second licensed functionality enabled by capability responses;
receiving a first capability response for the hardware device from the first hardware adapter, wherein the first capability response comprises a first timestamp, a unique identifier for the hardware device, a unique identifier for the first server, and a first functions list that enables the first licensed functionality on the hardware device; and
receiving a second capability response for the hardware device from the second hardware adapter, wherein the second capability response comprises a second timestamp, the unique identifier of the hardware device, a unique identifier for the second server, and a second functions list that enables the second licensed functionality on the hardware device, when the first server and the second server are a same server, replacing the first functions list with the second functions list, and when the first server and the second server are distinct, accumulating the first functions list and the second functions list to enable the first licensed functionality and the second licensed functionality on the hardware device.

2. The computer-implemented method of claim 1, wherein the first capability request and the second capability request each include the unique identifier of the hardware device.

3. The computer-implemented method of claim 2, wherein the unique identifier of the first server and the unique identifier of the second server are used to determine whether the first server and the second server are the same server.

4. The computer-implemented method of claim 1, wherein the first capability request and the second capability request are generated by a portal.

5. The computer-implemented method of claim 1, wherein the first capability request and the second capability request are generated by a request interface of the hardware device.

6. The computer-implemented method of claim 1, wherein the first functions list and the second functions list each comprise one or more licenses for one or more functionalities, and wherein the one or more licenses are stored in a buffer of the hardware device.

7. The computer-implemented method of claim 1, wherein the first functions list and the second functions list each comprise one or more licenses for one or more functionalities, and wherein the one or more licenses are stored in a persistent storage of the hardware device.

8. The computer-implemented method of claim 1, wherein either or both of the first server and the second server store capability fulfillment data in a storage.

9. The computer-implemented method of claim 1, wherein either or both of the first server and the second server are a proxy server configured to receive a capability request from the hardware device and transmit the capability request to a back office server on behalf of the hardware device, and wherein the back office server stores capability fulfillment data.

10. The computer-implemented method of claim 1, wherein either or both of the first licensed functionality and the second licensed functionality are configured to expire at a predetermined time or on a predetermined date.

11. The computer-implemented method of claim 1, wherein the first server is configured to generate and store a first record of all licensed functionalities enabled by the first hardware adapter and associated with the unique identifier of the hardware device, and wherein the second server is configured to generate and store a second record of all licensed functionalities enabled by the second hardware adapter and associated with the unique identifier of the hardware device.

12. A system for embedded licensing, comprising:
a hardware device configured to communicate with a plurality of servers, wherein the hardware device further comprises:
  a processor;
  a licensing kernel configured to:
    transmit a first capability request to a first hardware adapter of a first server, for storage at the first server as capability fulfillment data that comprises a first licensed functionality enabled by capability responses;
    transmit a second capability request to a second hardware adapter of a second server, for storage at the second server as capability fulfillment data that comprises a second licensed functionality enabled by capability responses;
    receive a first capability response from the first hardware adapter, wherein the first capability response comprises a first timestamp, a unique identifier for the hardware device, a unique identifier for the first server, and a first functions list that enables the first licensed functionality on the hardware device; and
    receive a second capability response from the second hardware adapter, wherein the second capability response comprises a second timestamp, the unique identifier of the hardware device, a unique identifier for the second server, and a second functions list that enables the second licensed functionality on the hardware device;
    determine whether the first server and the second server are a same server by comparing the unique identifier for the first server to the unique identifier for the second server,
    when the first server and the second server are the same server, replacing the first functions list with the second functions list, and
    when the first server and the second server are distinct, accumulating the first functions list and the second functions list to enable the first licensed functionality and the second licensed functionality on the hardware device; and
  a storage, wherein the storage is configured to store the first functions list and the second functions list.

13. The system of claim 12, wherein the first capability request and the second capability request each include the unique identifier of the hardware device.

14. The system of claim 12, wherein the hardware device further comprises:
a request interface, wherein the request interface allows a user to generate the first capability request and the second capability request.

15. The system of claim 12, wherein the system further comprises:
a web-based portal, wherein the web-based portal allows a user to generate the first capability request and the second capability request.

16. The system of claim 12, wherein either or both of the first functions list and the second functions list comprise one or more licenses for one or more functionalities, and wherein the one or more licenses are stored in a buffer of the hardware device.

17. The system of claim 12, wherein either or both of the first functions list and the second functions list comprise one or more licenses for one or more functionalities, and wherein the one or more licenses are stored in a persistent storage of the hardware device.

18. A method for updating embedded licenses, comprising:
receiving, by a hardware adapter of a server, a capability request for a hardware device, wherein the server stores capability fulfillment data that comprises one or more licensed functionalities enabled by capability responses, and wherein the capability request comprises a unique identifier for the hardware device and a selected functionality to be licensed;
analyzing the capability fulfillment data to determine whether the capability request can be fulfilled;
transmitting, by the hardware adapter, a capability response for the hardware device, wherein the capability response comprises a timestamp, the unique identifier of the hardware device, a unique identifier for the server, and a functions list that enables the selected licensed functionality on the hardware device;

generating a record of the capability response transmitted to the hardware device, wherein the record comprises the timestamp, the unique identifier of the hardware device, and the functions list;

storing the record of the capability response; and causing the hardware device to determine whether any capability requests have previously been transmitted by the server, when the hardware device determines a prior capability request was received, the hardware device replaces any prior functions lists transmitted by the hardware adapter with the functions list; and when the hardware device determines no prior capability request was received, the hardware device accumulates the functions list with any existing functions lists received by the hardware device from one or more other servers.

19. The method of claim 18, wherein the server is a proxy server configured to receive the capability request from the hardware device and transmit the capability request to a back office server on behalf of the hardware device, and wherein the back office server stores the capability fulfillment data.

* * * * *